United States Patent [19]

Hegler et al.

[11] Patent Number: 4,900,503

[45] Date of Patent: Feb. 13, 1990

[54] METHOD AND APPARATUS FOR PRODUCING A FINNED TUBE FROM SYNTHETIC PLASTICS MATERIAL

[75] Inventors: Wilhelm Hegler; Ralph-Peter Hegler, both of Goethestrasse 2, D-8730 Bad Kissingen, Fed. Rep. of Germany

[73] Assignee: Wilhelm Hegler, Bad Kissingen, Fed. Rep. of Germany

[21] Appl. No.: 227,424

[22] Filed: Jul. 29, 1988

[30] Foreign Application Priority Data

Jul. 30, 1987 [DE] Fed. Rep. of Germany ....... 3725286

[51] Int. Cl.$^4$ .............................................. B29C 47/20
[52] U.S. Cl. .................... 264/508; 264/515; 264/167; 264/173; 425/133.1; 425/326.1; 425/327; 425/380; 425/393; 425/396
[58] Field of Search ............... 264/167, 508, 173, 568, 264/566, 511, 515; 425/326.1, 325, 393, 396, 532, 516, 133.1, 327

[56] References Cited

U.S. PATENT DOCUMENTS

| | | | |
|---|---|---|---|
| 3,188,690 | 6/1965 | Zieg | 425/396 |
| 3,349,156 | 10/1967 | Zieg | 425/532 |
| 3,776,679 | 12/1973 | Hegler | 425/396 |
| 3,998,579 | 12/1976 | Nordstrom | 425/393 |
| 4,212,618 | 7/1980 | Hegler et al. | 425/396 |
| 4,319,872 | 3/1982 | Lupke et al. | 264/508 |
| 4,710,337 | 12/1987 | Nordstrom | 425/396 |
| 4,721,594 | 1/1988 | Jakvenkyla | 425/396 |

FOREIGN PATENT DOCUMENTS

| | | | |
|---|---|---|---|
| 0065729 | 3/1984 | European Pat. Off. | |
| 2362444 | 6/1975 | Fed. Rep. of Germany | |
| 2061027 | 3/1982 | Fed. Rep. of Germany | |
| 56-130323 | 10/1981 | Japan | 264/506 |

Primary Examiner—Jeffery Thurlow
Attorney, Agent, or Firm—Browdy and Neimark

[57] ABSTRACT

An apparatus for producing a finned tube from synthetic plastics material has a moulding chamber which moves in the direction of production. Molten synthetic plastics charge enters this moulding chamber from which fins are moulded one after another, the fins being in each case formed individually one after another. In order to ensure this procedural measure, there are constructed in the surface of the molten plastics material present in the moulding chamber annular raised portions with conveying surfaces trailing in the direcetion of production. Corresponding conveying grooves are constructed in the half moulds which bound the molding chamber. These measures ensure an accurate contour of the tube which is to be produced, ensuring that a reverse flow of molten plastics charge and its combustion will be prevented.

14 Claims, 5 Drawing Sheets

METHOD AND APPARATUS FOR PRODUCING A FINNED TUBE FROM SYNTHETIC PLASTICS MATERIAL

FIELD OF THE INVENTION

The invention relates to a method for producing a finned tube from synthetic plastics material in a moulding chamber moving in a direction of production, wherein a molten plastics charge enters the moulding chamber and wherein fins are moulded, which are provided one after another in the direction of production and wherein a tube is formed which is integral with the fins. The invention relates furthermore to an apparatus for carrying out this method for producing a finned tube from synthetic plastics material, the tube being provided with raised portions having conveyor faces trailing in a direction of production, with pairs of encircling half moulds which supplement each other on a moulding line to form a mould which moves in a direction of production, the half moulds comprising, defining an outside of a moulding chamber, a mould recess formed alternately by portions for moulding an outside wall of the tube and mould recesses for forming the fins, with, preceding the moulding chamber in the direction of production a nozzle with a nozzle gap and with a core adjacent the nozzle gap and defining an inside of the moulding chamber and widening out in the direction of production towards the moulding recess, forming a draught, with, immediately adjacent the nozzle gap and constructed between the draught of the core and the moulding recess an expansion space with, preceding the expansion space and constructed between the moulding recess and the nozzle, a safety gap and with a cooling core on a downstream side of the moulding core in the direction of production.

BACKGROUND OF THE INVENTION

Already known from DE-OS 23 62 444 is an apparatus of the afore-mentioned type, on which the method of the indicated type is performed. In this respect, the moulding core extends quite a way in the production direction until it is in front of the nozzle gap. In the region of the expansion space formed by the frustoconically widening out moulding core and the moulding recess there are numerous fin moulding recesses, the filling of which takes place in an undefined manner. Furthermore, there is no guarantee of reliable transporting of the tube with fins through the moulding chamber.

Known from U.S. Pat. No. 3,998,579 is an apparatus similar to the afore-mentioned apparatus, in which the moulding chamber is adjacent a molten batch passage. Mounted at the end of the moulding chamber is a frustoconically widening moulding core by means of which the tube is calibrated. Here, too, filling of the fin moulding recesses is undefined. Furthermore, there is a considerable danger of molten material penetrating the region between the nozzle and the moulding recess and burning.

SUMMARY OF THE INVENTION

It is a main object of the invention to develop a method of the afore-mentioned type that accurate filling of the fin moulding recesses and thus an exact contour of the tube to be produced can be achieved.

According to the invention, this problem is solved by a method for producing a finned tube from synthetic plastics material, wherein the fins are moulded one after another whereby a fin is formed only after a fin which leads it in the direction of production has already been completely formed and wherein raised portions having conveyor faces trailing in the direction of production are constructed in a surface of the molten plastics charge which is present in the moulding chamber. The raised portions which have to be constructed according to the invention already entrain the still almost fluid synthetic plastics material. In the region of these raised portions, it already cools slightly so that there is an increased entraining effect. Consequently, it is ensured that at all times material is first forced into a leading fin moulding recess which is not completely filled and that only when this is completely filled is the molten material forced back and fills the next fin moulding recess in succession. The raised portions furthermore ensure that there can be no reverse flow of material.

Furthermore, the problems mentioned before are solved by an apparatus of the type indicated, wherein the portions for moulding the outside wall of the tube are provided with conveyor grooves with a conveying surface on a rearward side with regard to the direction of production. The inventive features guarantee that the raised portions are moulded on the tube and that the tube is entrained.

When a radial extension of the expansion space is, immediately upstream of the nozzle gap smaller than twice the wall thickness of the tube and particularly smaller than 1.5 times the wall thickness of the tube, there is no overpressure in the expansion space which could force the molten material back into the gap between the nozzle and the moulding recess, which is in any event prevented by the conveying grooves in the half moulds.

Further advantages and features of the invention will become apparent from the ensuing description of an embodiment, taken in conjunction with the drawings.

DESCRIPTION OF A PREFERRED EMBODIMENT

Figure 1:
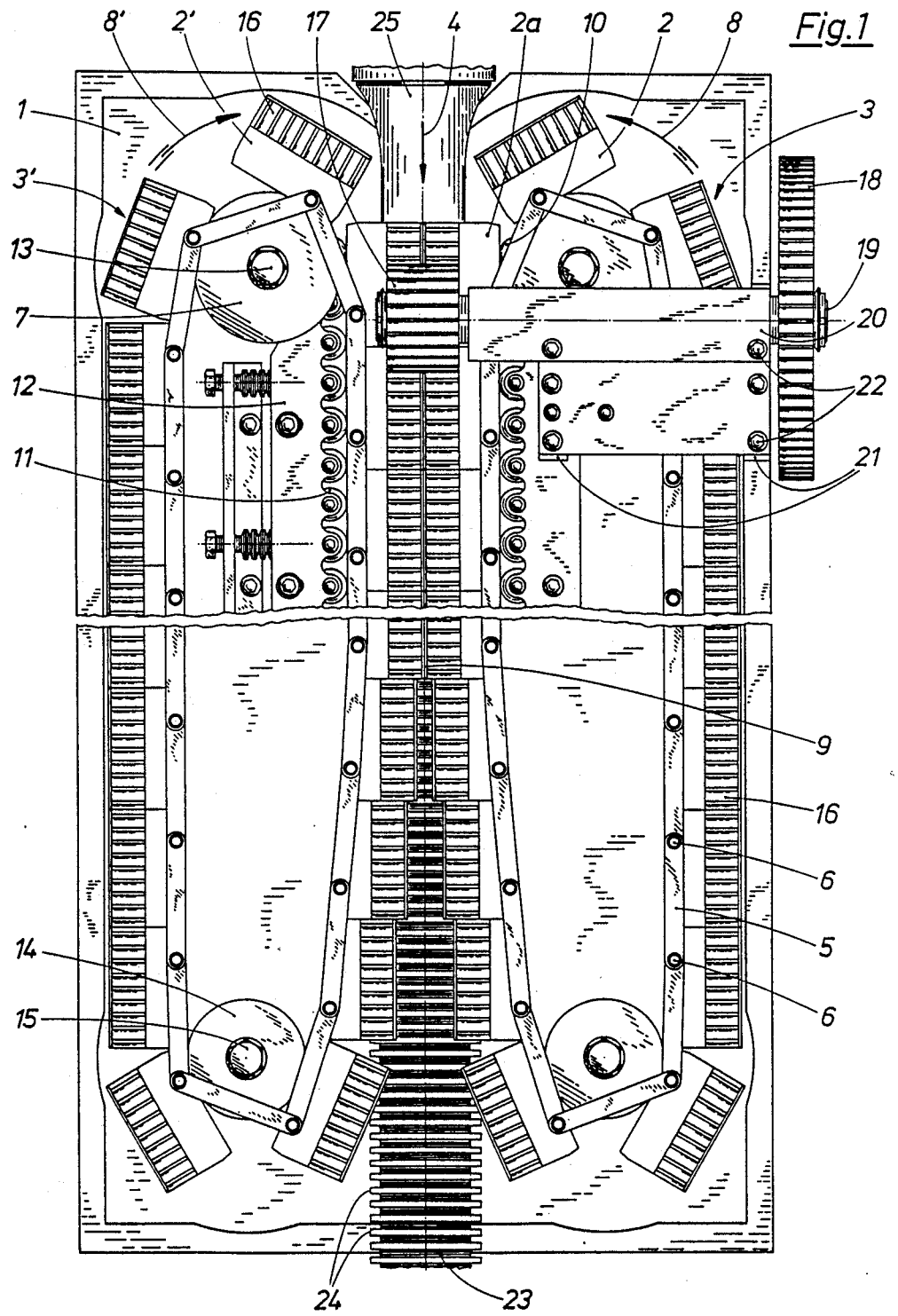
FIG. 1 is a plan view of an apparatus for producing finned tubes from synthetic plastics material.

As FIG. 1 shows, the apparatus for producing synthetic plastics finned tubes comprises a machine table 1 on which are disposed series of half moulds 2, 2' which are in each case connected to each other to form two so-called chains 3, 3'. To this end, there is articulated on each half mould 2, 2', on its outer and, in the production direction 4, front region, a connecting member 5 secured by a hinge pin 6 and mounted at the corresponding location on the subsequent half mould 2, 2' likewise by means of such a hinge pin 6. The chains 3, 3' which are so formed are, at their rear ends, as viewed in the production direction 4, guided over direction-reversing wheels which serve as so-called feed rollers 7. The individual half moulds 2, 2' are, during revolution of the chains 3, 3' corresponding to the directional arrows 8, 8', pivoted into a moulding line 9 in which every two half moulds 2, 2' are combined to form a pair of moulds in which pairs of moulds which follow in sequence in the production direction 4 are located in a tightly adjacent relationship. In order to achieve rapid closure of the half moulds 2, 2' to form a parallel and abutting position, so-called closing rollers 10 are provided which accelerate the bringing together of the (in the production direction 4) rear ends of the half moulds 2, 2'. In the moulding line 9 itself, the adjacent half moulds 2, 2' are pressed against each other by guide rollers 11 which are mounted to be rotatable in guide strips 12. The feed rollers 7 are mounted on the machine table 1 in such a way as to be rotatable about pivots 13.

At the front or downstream end of the machine table 1, in relation to the production direction 4, there are likewise return rollers 14 which serve as direction-reversing wheels and which are mounted to rotate about pivots 15, and about which the chains 3, 3' are deflected and fed back to the feed rollers 7. As can be seen in FIG. 1, the guide strips 12 with guide rollers 11 end in front of the return rollers 14 by the length of several half moulds 2, 2' so that the half moulds 2, 2' can once again be moved parallel with one another and away from one another transversely to the direction of production 4, before they are pivoted by the return rollers 14. Constructed on the top of the half moulds 2, 2' is a system of teeth 16, the two sets of teeth and 16 of the half moulds 2, 2' which are associated with one another in pairs are aligned so that a common drive pinion 17 can engage these teeth 16 from above, pushing the half moulds 2, 2' through the moulding line 9 as a closed mould. The drive of this driving pinion 17 is provided in conventional manner by a motor, not shown, through a driving gear wheel 18 which is rotationally rigidly mounted on a shaft 19 which in turn carries the driving pinion 17. The shaft 19 is mounted in a bearing pedestal 20 which is supported through spacing prisms 21 in respect of the machine table to which it is rigidly connected by screws 22.

The apparatus shown is used (see FIG. 2) for producing synthetic plastics tubes 23 having fins 24 extending like closed annular discs radially and over the outer periphery of the tubes 23. Such finned tubes have a particularly high crushing strength. An extruder is provided of which only the injection nozzle 25 is shown from which, in a manner still to be described in detail hereinafter, molten synthetic plastics material 23a is extruded flowing in a liquid state into the mould formed in the moulding line 9 and in which the tube 23 is constructed with the fins 24.

The hitherto described apparatus is known, with the exception of the special construction of the tubes 23 with fins 24, being known for example from DE-PS 20 61 027 or EP-PS 0 065 729.

The half moulds 2, 2' which are disposed in adjacent pairs are cooled in the moulding line 9. For this purpose, cooling water passages 26 are constructed in them. The moulding recesses 28 which are formed in the half moulds 2, 2a in order to form a moulding chamber 27 are of a shape which is complementary to the outer form of the tube 23 with fins 24. At their radially outermost locations, they are provided with venting ports or slots 29 which discharge into venting passages 30. These are connected to partial vacuum sources, not shown, so that venting and complete filling of the moulding chamber 27 with synthetic plastics material to form the tube 23 with fins 24 is guaranteed.

In the region in which the half moulds 2, 2' are as yet not completely closed to form one mould, the injection moulding nozzle 25 is enclosed by heating means 31 in order to maintain at the necessary temperature the compressed molten synthetic plastics material 23a which is extruded from the extruder and conveyed through the injection moulding nozzle 25. If polyvinyl chloride (PVC) is used as a synthetic plastics material, then this temperature is about 195° to 200° C. Shortly after the commencement of the moulding line, in other words shortly after the region at which the complementary half moulds 2, 2' are rigidly adjacent each other, the outer periphery of the injection moulding nozzle 25 widens out to a cylindrical end portion 32. The corresponding half mould which happens to be in its closed position is designated by reference numeral 2a in the drawing. Between the radially inner side 33 of the half mould 2a and the cylindrical end portion 32 there is only a safety gap 34 which ensures that the half mould 2a does not come in contact with the cylindrical end portion 32 of the injection moulding nozzle 25. Therefore, the width of the safety gap amounts to between 0.3 and 0.8 mm.

There is constructed in the end portion 32 of the injection moulding nozzle 25 a constantly outwardly widening passage 35 for molten material, being inwardly defined by a moulding core 36. At the emergence of the passage 35 for molten material from the cylindrical end portion 32 of the injection moulding nozzle 25, in other words at the nozzle gap 37, there is an expansion space 38 (see FIGS. 3 and 4), the radial extension a of which is as far as possible no more than 1.5 times the minimum wall thickness b (see FIG. 9) of the tube 23.

The injection moulding core 36 comprises, adjacent the nozzle gap 37, a first conical portion 39 (see FIG. 3) which is followed in the production direction 4 by a second conical portion 40. The first conical portion 39 forms with the median longitudinal axis 41 of the injection moulding nozzle 25 or of the tube 23 to be produced or of the moulding chamber 27 an angle c of about 5°. The second conical portion 40 forms with the axis 41 an angle d of about 3°. The transition 42 of the moulding core 36 in the region of the nozzle gap 37 into the first conical portion 39 is rounded off. The first conical portion 39 and the second conical portion 40 together form a draught 43 adjacent to which there is another cylindrical portion 44 of the injection moulding core 36.

A calender head 45 is mounted on the injection moulding core 36, in fact on its cylindrical portion 44. The said calender head 45 is pot-shaped, i.e. it has, open in the production direction 4, a cylindrical recess 46 which is lined with a bell-shaped heat insulating means 47 (see FIG. 2). For attachment of the calender head on the injection moulding core 36, screw bolts 48 are used. The calenderhead 45 has in the region adjacent the cylindrical portion 44 of the moulding core 36 a conical portion 49 which widens out in the production direction 4 and which has adjacent to it a cylindrical portion 50. The conical portion 49 encloses with the axis 41 an angle e of 3° to 4°.

The injection moulding core 36 and with it the calenderhead 45 mounted on it are disposed on a core holder 51 being held there by means of an annular nut 52 on a screw thread 53 on the core holder 51.

Figure 2:
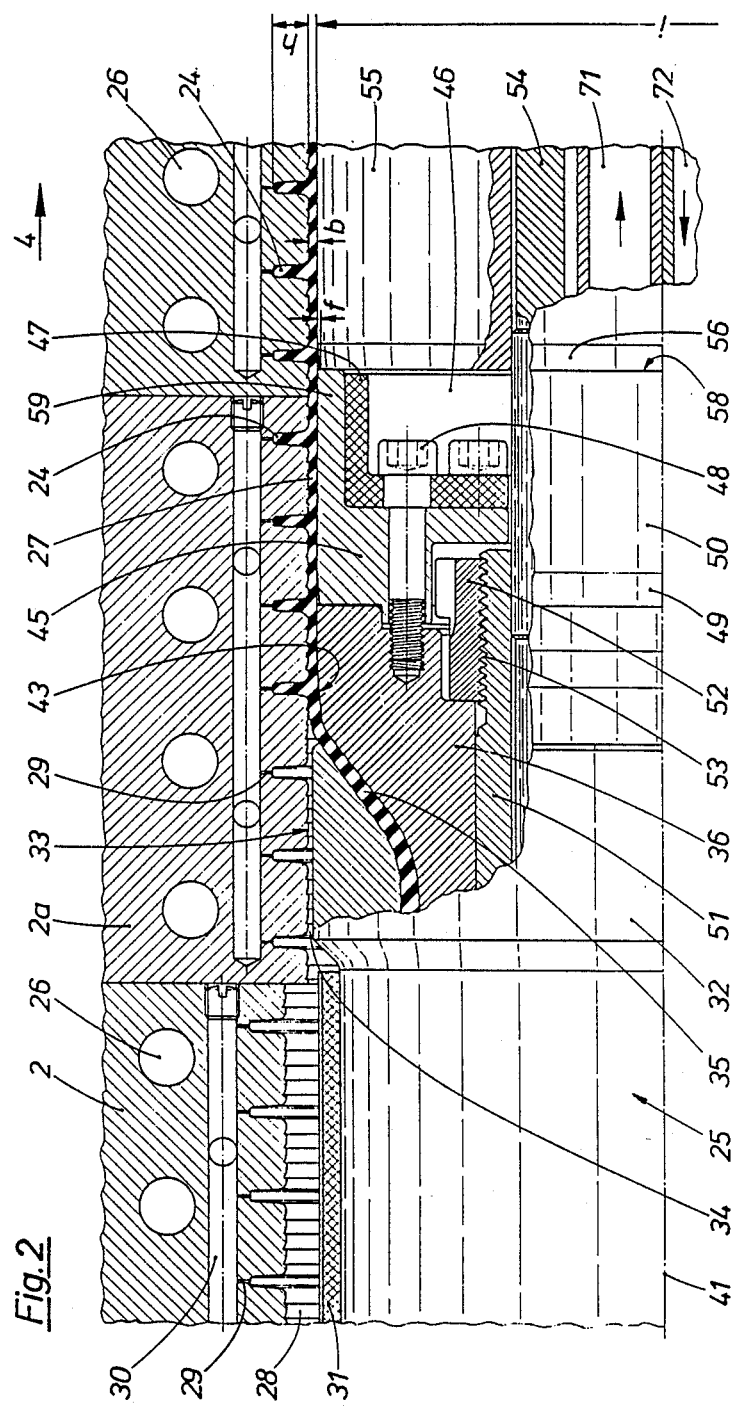
FIG. 2 is a detail from the apparatus in a horizontal section.

Concentrically with the axis 41, there extends through the core holder 51 a hollow cooling core 54 on which a cooling core 55 is mounted. The said cooling core 55 can be cooled by cooling water which is supplied and discharged through the hollow core 54. A corresponding cooling water feed 71 and cooling water discharge 72 are indicated in FIG. 2. At the transition between the cylindrical portion 50 of the calender head 45 and the cooling core 55, this latter has, widening out in the production directiion 4, a conical extension 56 which encloses an angle f of 3° to 4° with the axis 41. Otherwise, the cooling core 55 is of cylindrical construction. The calenderhead 45 lies flat against the annular end face 57 of the moulding core 36. The cooling core 55 has a matching surface 58 which bears on the associated end of the calender head. Consequently, a flow of heat can pass from the moulding core 36 through the calender head 45 to the cooled core 55 which is arrested in the calender head 45 by the bell-shaped heat insulating means 47, since the heat through-flow cross section in the annularly cylindrical part 59 of the calenderhead 45 is relatively small.

The moulding recess 28 in the half moulds 2, 2a comprises substantially cylindrically constructed portions 60 for moulding the outside wall of the tube and constituting the radially inner face 33 of the corresponding half mould 2, 2a and between which at constant distances there are fin moulding recesses 61 which serve to form the fins 24. The portions 60 which mould the outside wall of the tube comprise conveying grooves 62 which extend around the complete cylindrical periphery of the mould portions 60, leading to corresponding annular raised portions 63 on the outer wall of the tube.

The conveying grooves 62 are on their side which is at the rear or upstream in relation to the production direction 4, defined by a conveying surface 64 which extends substantially radially of the axis 41. Their other boundary surface 65 extends shallow pitched to the axis 41 in the direction of the next conveying surface 64 of the next leading conveying groove 62 in the direction of production 4.

A finned tube is produced essentially in three stages.

Figure 3:
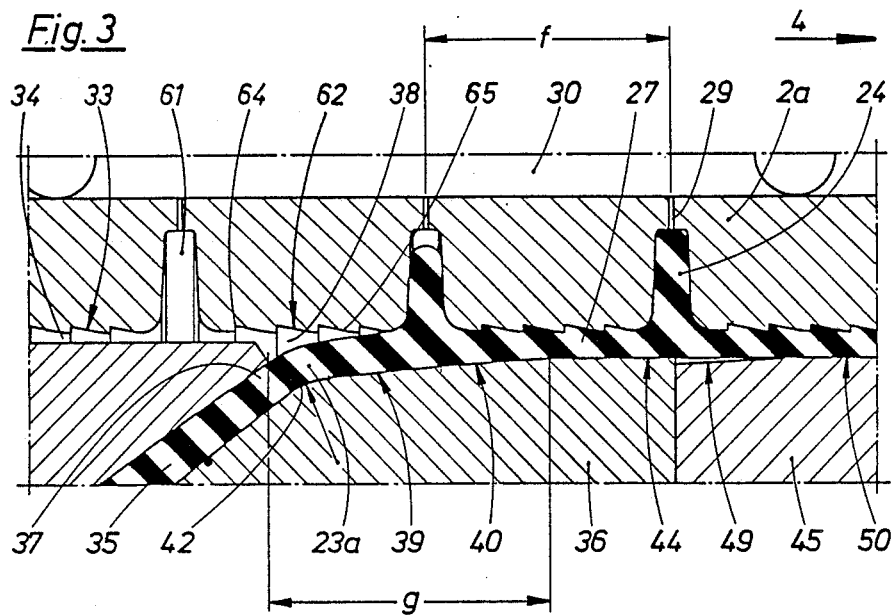
FIG. 3 to FIG. 6 show a detail from FIG. 2 in various stages of production.
Figure 4:
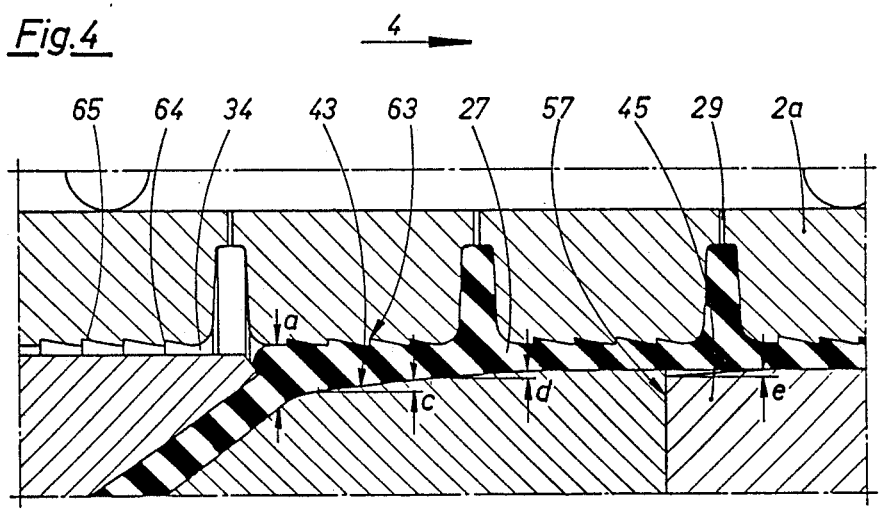
Figure 5:
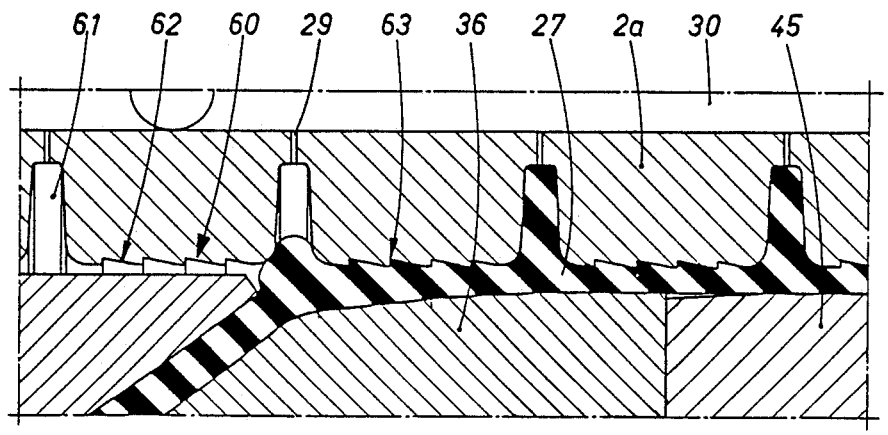
Figure 6:
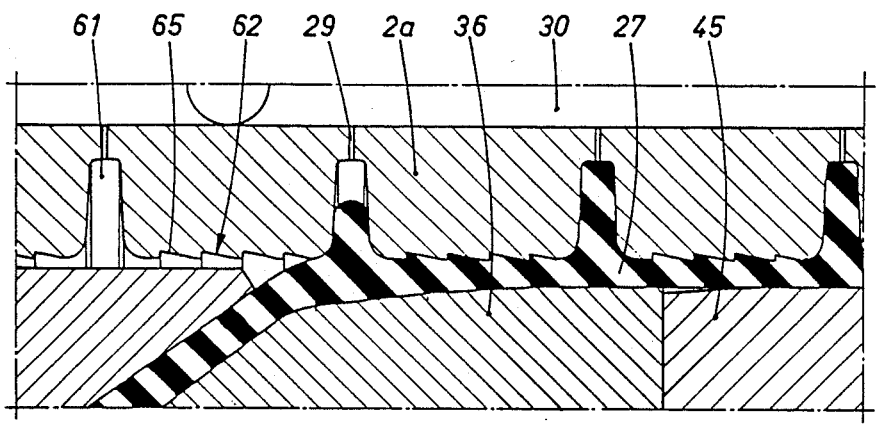

In the first stage, the highly compressed molten plastics charge 23a is forced through the nozzle gap 37 into the expansion space 38 at the beginning of the moulding chamber 27. As FIG. 3 shows, a fin moulding recess 61 disposed immediately in front of the expansion space 38, in the production direction 4, is filled. The air present in the moulding recess 61 is extracted through the vent slots 29 the width of which is so small that molten fluid material cannot penetrate them. As the half mould 2a continues moving on, the fin moulding recess 61 becomes completely filled, as FIG. 4 shows. When this stage is reached, the expansion space 38 fills since for a constant production speed in the production direction 4, i.e. at a constant speed of the half moulds 2a, the molten plastics charge 23a is required only to produce the cylindrical wall portion of the tube 23. When a next fin forming recess 61 is in position over the expansion space 38, then the molten material 23a is forced into this fin moulding recess 61, as FIG. 5 shows. As the half mould 2a continues to move on, this moulding recess 61 is filled, so that the expansion space 38 which is left over relative to the half mould 2a and to this moulding recess 61 is again partly emptied of molten plastics charge. At the portions 60 which mould the outer wall of the tube, the molten material is disproportionately cooled so that in this region it is no longer thinly fluid but is very viscous. The conveying surfaces 64 of the conveying grooves 62 therefore exert a considerable conveying action on the synthetic plastics material. The ratio of the distance f between adjacent fins 24, i.e. adjacent fin moulding recesses 61 to the axial length g of the expansion space 38 is in the range from 1:1 to 1:1.5. In this range, in fact particularly in the bottom part of this range, it is ensured that due to the intensified conveyance of molten plastics batch 23a through the conveying grooves 62, the individual fin moulding recesses 61 are filled one after another. At the end of this first phase, one tube 23 is already available.

The second phase in moulding the tube 23 takes place over the calenderhead 45 which has a mirror-bright surface in order to calibrate the still warmly-plastic tube 23 so that it later has a clean and smooth inner surface 67. In this phase 2 over the calenderhead 45, there is a partial cooling of the tube 23, its surface zone of for instance 0.1 mm depth being already cooled to 50° to 60° C.

The third phase in the manufacture of the tube 23 takes place over the cooling core 55 on which actual calibration of the tube 23 is performed. The conical portion 49 of the calenderhead 45 and the conical extension 56 of the cooling core 55 have in each case the task of ensuring a seamless transition of the tube 23 at the corresponding transition point.

As is clear from the foregoing, at any one time there is always only one fin 24 being formed, i.e. a plurality of fin moulding recesses 61 will not be filled at the same time. Only when the last fin moulding recess 61 is filled with molten material does the next moulding recess 61 arrive above the expansion space 38.

Figure 7:
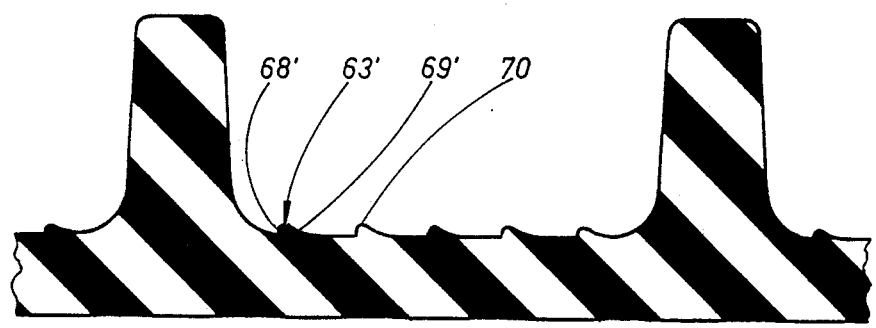
FIG. 7 to FIG. 9 show details through finned tubes having various types of annular raised portions.
Figure 8:
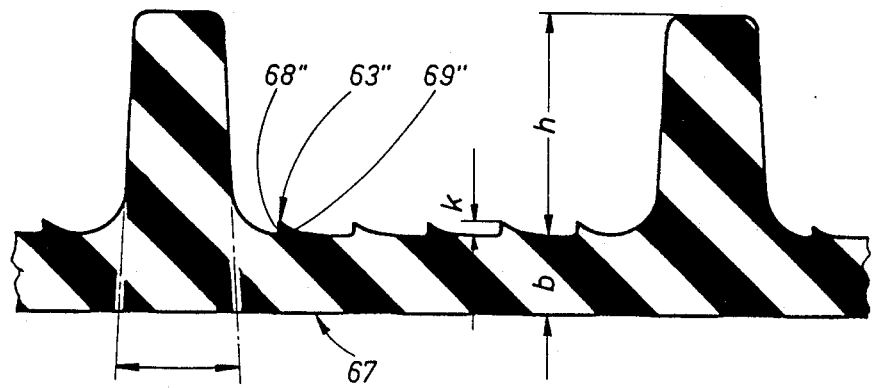
Figure 9:
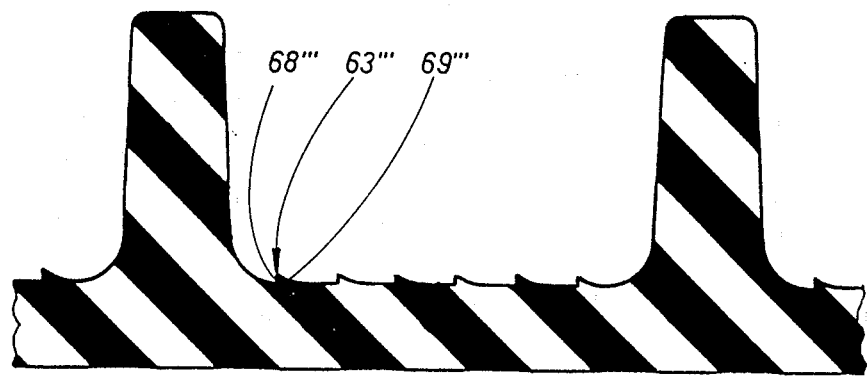

FIGS. 7, 8 and 9 show different annular raised portions 63', 63'', 63''', to which adapted mould conveying grooves in the half mould 2a correspond. FIG. 7 shows an annular raised portion 63' with a radially downwardly sloping conveying surface 68' to which corresponds an appropriate conveying surface which serves as a boundary to the associated fin moulding recess. This conveying surface 68' therefore extends substantially at a right angle to the median longitudinal axis 41 which is not shown in FIGS. 7, 8 and 9. The same applies to the conveying surfaces 68'' and 68''' in the case of the developments according to FIGS. 8 and 9. In FIG. 7, the transition to the flatly downwardly sloping flank 69' is provided with a marked rounding 70. By reason of this rounding 70 there is no notch effect in the corresponding conveying groove in the half mould 2a. The flank 69' is moulded on the boundary surface 65 of the half mould.

Where the developments according to FIGS. 8 and 9 are concerned, the transition from the conveying surface 68'' or 68''' to the flank 69'' or 69''' is acute. This leads to a correspondingly good conveying effect, certainly to a disadvantageous notch effect in the half shell 2a. In the case of the development according to FIG. 9, the annular raised portions 63''' are constructed with a lesser radial height and at a smaller distance from one another.

The fins 25 have a radial height h—measured from the root of the conveying surfaces 68 or flanks 69—which is about 0.035 i, i designating the inside diameter of the tube 23. The minimum wall thickness b of the tube corresponds to about 0.015 i. The height of the annular raised portions 63 amounts to about 0.12 b to 0.16 b.

What is claimed is:

1. A method for producing a finned tube from synthetic plastics material in a moulding chamber moving in a direction of production, comprising the steps of a molten plastics charge entering the moulding chamber having fin forming vented slots therein, fins provided one after another in the direction of production each being completely moulded and a tube being formed which is integral with the fins, wherein the fins are moulded one after another, whereby a fin is formed only after a fin which leads it in the direction of production has already been completely formed and wherein raised portions having flanks which are shallow pitched in the direction of production and having conveyor faces trailing in the direction of production are constructed in a surface of a moten plastics charge which is present in the moulding chamber, said conveyor faces being disposed substantially at a right angle to the axis of production and said raised portions having a height equal to about 0.12–0.16 times the minimum wall thickness of said tube.

2. A method according to claim 1, wherein the raised portions are constructed as annular raised portions.

3. A method for forming a finned tube from a synthetic plastic material, comprising
   continuously extruding said synthetic plastic material in molten form around a fixed axially extending core while simultaneously forming an axially moving exterior moulding chamber thereabout and continuously moving said moulding chamber in an axial direction of production away from the point of extrusion, said moulding chamber having radially extending fin forming vented slots therein and a plurality of radially extending conveyor grooves each having an upstream conveying surface disposed at substantially a right angle with regard to the direction of production and a flank shallow pitched in the direction of production,
   forcing molten plastic into said vented mould recesses to completely form in sequence a series of radially extending fins one after another, an upstream fin being formed only after its immediate downstream adjacent fin has been completely formed,
   forcing molten plastic into said conveyor grooves to form a series of raised portions having a height equal to about 0.12–0.16 times the minimum wall thickness of said tube being formed, and
   advancing said tube in the direction of extrusion as it is being formed by movement of said moulding chamber in the direction of extrusion while maintaining frictional interengagement between said conveyor grooves of said moulding chamber and said raised portions of said tube.

4. An apparatus for carrying out a method for producing a finned tube from synthetic plastics material, the tube being provided with raised portions (63) of height equal to about 0.12–0.16 times the minimum wall thickness of said tube, said raised portions having conveyor faces (64) trailing in a direction of production (4), with pairs of encircling half moulds (2, 2′, 2a) which supplement each other on a moulding line (9) to form a mould which moves in a direction of production (4), the half moulds (2, 2′, 2a) comprising, defining an outside of a moulding chamber (27), a mould recess (28) formed alternately by portions (60) for moulding an outside wall of the tube and vented mould recesses (61) for completely forming the fins, with, preceding the moulding chamber (27) in the direction of production (4) a nozzle (25) with a nozzle gap (37) and with a core (36) adjacent the nozzle gap (37) and defining an inside of the moulding chamber (27) and widening out in the direction of production (4) towards the moulding recess (28), forming a draught (43), with, immediately adjacent the nozzle gap (37) and constructed between the draught (43) of the core (36) and the moulding recess (28) an expansion space (38) with, preceding the expansion space (38) and constructed between the moulding recess (28) and the nozzle (25), a safety gap (34) and with a cooling core (55) on a downstream side of the moulding core (36) in the direction of production (4), wherein the portions (60) for moulding the outside wall of the tube are provided with conveyor grooves (62) of size to form said raised portions (63), said conveyor grooves (62) being provided with a conveying surface (64) on a rearward side and at substantially a right angle with regard to the direction of production (4), said conveyor grooves (62) having flanks (65) which are shallow pitched in the direction of production.

5. An apparatus according to claim 4, wherein a radial extension (a) of the expansion space (38) is, immediately upstream of the nozzle gap (37) smaller than twice the wall thickness (b) of the tube (23).

6. An apparatus according to claim 5, wherein the radial extension (a) of the expansion space (38) immediately upstream of the nozzle gap (37) is smaller than 1.5 times the wall thickness (b) of the tube (23).

7. An apparatus according to claim 4, wherein the length (g) of the expansion space (38) in the direction of production (4) corresponds substantially to 1 to 1.5 times the gap (f) between two adjacent fin moulding recesses (61).

8. An apparatus according to claim 4, wherein between the moulding core (36) and the cooling core (55) there is a calender head (45) which serves for calibrating an inside wall of the tube (23).

9. An apparatus according to claim 8, wherein the calender head (45) is heat-conductively connected to the cooling core (55).

10. An apparatus according to claim 9, wherein the calender head (45) has in it a recess (46) so that it is pot-shaped, the recess (46) facing the cooling core (55).

11. An apparatus according to claim 10, wherein the recess (46) is at least partially provided with heat insulation (47).

12. An apparatus according to claim 8, wherein the calender head (45) is heat-conductively connected to the moulding core (36).

13. An apparatus according to claim 4, wherein the conveyor grooves (62) have a rounded shape (70) in a radially outer transition zone from the conveying surface (64) into said flank.

14. An apparatus according to claim 4, wherein the conveyor grooves (62) are of sharp edged construction in a radially outer transition zone from the conveying surface (64) into said flank.

* * * * *